March 27, 1956 — E. C. ELSNER — 2,739,439
METHOD AND TOOL FOR MAKING ROPE JOINTS
Filed April 2, 1951
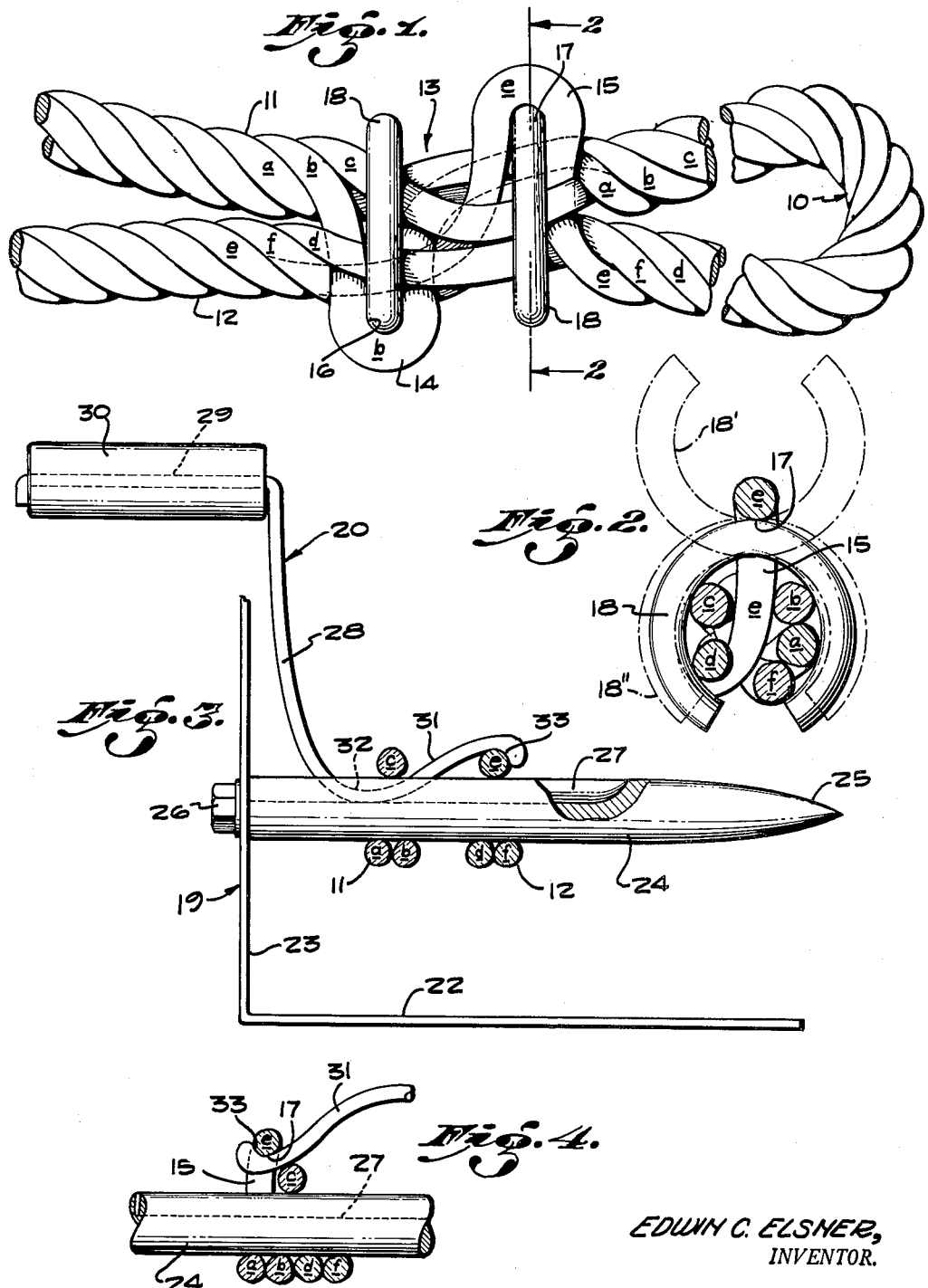
EDWIN C. ELSNER,
INVENTOR.
BY 
ATTORNEY

United States Patent Office 2,739,439
Patented Mar. 27, 1956

2,739,439

METHOD AND TOOL FOR MAKING ROPE JOINTS

Edwin C. Elsner, Glendale, Calif., assignor to General Logistics, Pasadena, Calif., a corporation of California Application April 2, 1951, Serial No. 218,845

8 Claims. (Cl. 57—23)

The present invention relates generally to the art of rope and cable working, and is more particularly concerned with a method and tool by which the method may be carried out, wherein sections of flexible stranded members, such as ropes and cables, may be adjacently disposed and interconnected.

The present invention is especially advantageous of use in the making of cargo nets, cargo slings, and other cable and rope assemblies in which adjacent rope and cable sections are joined by means of joints such as described in my copending application entitled "Rope and Cable Joint," Serial No. 185,125, now Patent No. 2,651,824.

In accordance with the general concepts of the present invention, it is sought to provide an improved method and tool for carrying out the method, by which rope sections may be quickly joined without having to cut the sections or utilize additional rope or cable for splicing the sections together.

A further object is to provide rope and cable working tools of novel construction, which are simple to operate, and by the use of which a strong joint will be quickly and readily obtained, and wherein the joined sections of the rope or cable will be effectively retained against separation and slippage.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is an elevational view of a rope or cable joint such as may be effected by the method and tool of the present invention;

Fig. 2 is a tranverse section through the joint, taken substantially on line 2—2 of Fig. 1;

Fig. 3 is a side elevational view of the rope working tools of the present invention, showing their operative association and rope sections to be joined; and Fig. 4 is a fragmentary view illustrating one position of the associated tools, during the formation of the joint.

It is believed that the method and tool of the present invention will be more clearly understood, if the details of the rope or cable joint formed thereby, is first described. As shown in Fig. 1, there is illustrated a device fabricated from a rope or cable, wherein a loop has been formed as indicated at 10 by securing adjacently positioned rope sections 11 and 12 together in a joint, as generally indicated at 13. Although the joint in the present instance is used to form a loop, the joint is generally applicable for use in different types of rope structures, for example, for joining sections so as to fabricate therefrom a cargo net, or the like.

The rope sections are made up of twisted strands, section 11 consisting of the three strands $a$, $b$, and $c$, and section 12 having the three strands $d$, $e$, and $f$.

In the completed joint connecting the sections 11 and 12, it will be seen that loop portions 14 and 15 of the sections 11 and 12 respectively, are laterally extended between strands of the associated section. More specifically, the strand $b$ is formed into the loop portion 14 which is passed between strands $d$ and $f$ of section 12 and laterally projects therefrom to define a loop eye 16. In a similar manner, strand $e$ of section 12 is formed into the loop portion 15, this loop being laterally extended between the strands $a$ and $c$ of section 11, and projecting therefrom so as to define a loop eye 17.

The loop portions 14 and 15 are anchored against disengagement by means of split or open end rings 18. As shown in Fig. 2, the rings 18 are initially of cylindrical or substantially cylindrical configuration with their ends spaced apart sufficiently to permit the lateral passage therethrough of the particular strands of the rope sections with which utilized, and are of sufficient diameter to receive the two rope sections therein.

The ring 18 is initially threaded through the associated loop portion 14 or 15 as the case may be, and positioned with its entrance opening facing outwardly away from the associated rope section, as indicated at 18' in dotted lines. In this position, the ring prevents retraction of the associated loop portion, and will thus serve as an anchor for the loop portion so that a stress may be applied to the rope sections.

The ring is then rotatably swung to the dotted line position 18″ so as to encompass and extend around both sections 11 and 12. Completion of the joint is now accomplished by deforming the ring 18 so as to bring its separated ends more closely together, as shown in full lines, and clampingly engage the strands of both rope sections 11 and 12. The sections are thus held against lateral separation and slippage between the interconnected strands is prevented.

While the joint shown in Fig. 1 utilizes a double connection between the rope sections 11 and 12, the sections may be interconnected by a single interconnection consisting of only one loop portion and its associated ring 18.

The present invention will be explained and its use described for effecting a single interconnection between the rope sections. For such purpose, operatively associated rope working tools 19 and 20 are utilized.

The tool 19 has a base structure composed of integrally connected right angled sections 22 and 23, the section 22 being arranged for horizontal secured position on a bench or platform, and the section 22 constituting a vertically extending portion.

Extending in parallel relation above the section 22 is an elongate member 24 having a pointed end 25 so as to form in effect a marline spike secured at its opposite end by an anchor bolt 26 to the upright section 23 of the base structure. An elongate groove 27 extends longitudinally along the upper surface of the member 24, this groove being terminated adjacent the pointed end 25. The rope working tool 20 consists of a suitable length of bar or wire material which is fabricated to provide a shank portion 28 between its ends. One end is deflected to form a substantially right angled section upon which a handle grip 30 is mounted.

The opposite end is deflected in an opposite direction from the section 29 and is bent or otherwise formed into a generally S-shaped spike or end section which joins the shank 28 in a smooth curve 32 and at its end terminus provides a shallow hook 33.

The manner of utilizing the rope working tools described above, will now be explained. The rope sections to be jointed, in this instance sections 11 and 12 are impaled on the member 24 with one strand of each section, such as strands $c$ and $e$, similarly disposed over the upper surface of the member and groove 27. The rope working tool 20 is now manipulated by placing the curved portion 32 in the groove 27 so that the end section passes under strand $c$ of section 11 and the hook 33 engages over the strand $e$ of section 12. By now rotating the tool 20 in a clockwise direction, as shown in Fig. 3, about its end section 31 as a fulcrum, the end section 31 serves as a finger lever to raise the strand $c$ so that the hook 33 will carry the strand $e$ of section 12 thereunder, while simultaneously forming the strand $e$ into a projecting loop portion 15 with a loop eye 17 so positioned as to receive a split ring 18 therein as previously described.

By comparing the positions of the hook 33 in Figs. 3 and 4, it will be observed that the hook 33 has been turned through substantially an angle of 180° and has been inverted so that it now opens upwardly instead of downwardly.

The tool 20 may at this point be given a slight twisting movement so as to twist the loop portion 15. This twist will act to retain the loop portion in projecting position and enable the two rope sections to be removed from member 24 prior to inserting the ring 18 in the loop eye 17. After removal, one of the split rings is inserted in the loop portion in the manner shown in Fig. 2 by dotted line position 18'. The ring is then rotated to position 18'' and clamped around the adjacent sections as previously explained.

The utilization of the rope working tool described above provides a simple device by which a person who is unskilled in rope working may carry out the method of the present invention and secure an expert rope connection between rope sections which may form a part of a cargo net, cargo sling, or other fabricated rope structure.

I claim:

1. A rope joint tool, comprising: an elongate spike having a lengthwise extending groove on its upwardly disposed surface, said spike being adapted to have rope sections to be joined impaled thereon with the spike extending between the strands thereof; and an elongate member having a handle at one end, said member being curved in one direction between its ends and having a shallow hook curved in an opposite direction at its other end, and being guidingly movable endwise in said groove to pass its hooked end portion under a strand of one section and engage said hook over a corresponding strand of another section, whereby a swinging movement of said member will carry the hooked strand under the corresponding strand of the other section so as to form a projecting loop eye adapted to receive an anchor member.

2. A rope joint tool, comprising: an elongate spike having a lengthwise extending groove on its upwardly disposed surface, said spike being adapted to have rope sections to be joined impaled thereon with the spike extending between the strands thereof; and a finger lever member movable longitudinally in said groove so as to pass under a strand of one section and over a strand of another section, said member being swingable to carry the latter strand under the first strand so as to form a projecting loop eye adapted to receive anchoring means.

3. A rope joint tool, comprising: an elongate spike adapted to be inserted between the strands of adjacent sections of rope impaled thereon; and means cooperable with said spike for engaging and moving a strand of one section under an adjacent strand of the other section to form a projecting loop eye adapted to receive an elongate anchor member therethrough.

4. A rope working tool, comprising: an elongate bar having one end laterally deflected to form a handle and its other end deflected substantially in an opposite direction to said handle in a generally S-shaped end portion, the end terminus of which forms a blunt shallow hook.

5. The method of making a joint between multi-strand rope sections, which comprises the steps of: impaling rope sections to be joined on a spike to similarly position one strand of each section; simultaneously applying pressure against said strands in opposite directions to move the said strand of one of said sections under the similarly positioned strand of the other section to form a projecting loop eye while retaining the sections on said spike; and anchoring said looped strand by passing an elongate member through said loop eye.

6. The method of making a joint between multistrand rope sections, which comprises the steps of: impaling rope sections to be joined on a spike member with one strand of each section forming a loop passing over said spike member; raising one of said loops relative to the other; and passing the other loop under and through the raised loop to form with said other loop a loop eye adapted to receive an anchor member therethrough.

7. The method of making a joint between multistrand rope sections, which comprises the steps of: impaling rope sections to be joined on a spike member with one strand of each section forming a loop passing over said spike member, the loops being adjacently positioned; and relatively moving said adjacently positioned loops so as to pass one of said loops through the other loop and form with said one loop a projecting loop eye adapted to receive an anchor member for opposing withdrawal of said one of said loops from the other loop.

8. The method of making a joint between multistrand rope sections, which comprises the steps of: spreading the strands of adjacently disposed rope sections by impaling said sections on a spike to similarly position one strand of each section; simultaneously engaging said similarly positioned strands with a second spike; relatively moving each of said spikes to simultaneously apply pressure against said strands in opposite directions, to thereby pass one of said strands under the other of said strands to form a projecting loop eye; anchoring said looped strand by passing an elongate member through said loop eye; and thereafter securing said rope sections by deforming said elongate member.

References Cited in the file of this patent

UNITED STATES PATENTS

| 38,634 | Warth | May 19, 1863 |
| 371,671 | Collins | Oct. 18, 1887 |
| 439,583 | Verrill | Oct. 28, 1890 |
| 961,201 | Altheide | June 14, 1910 |
| 989,378 | Martin | Apr. 11, 1911 |
| 1,010,963 | Schuttee | Dec. 5, 1911 |
| 1,757,610 | Bergdal | May 6, 1930 |
| 1,890,509 | Hopkins | Dec. 13, 1932 |
| 2,261,447 | Payne | Nov. 4, 1941 |
| 2,394,884 | Adrias | Feb. 12, 1946 |
| 2,488,312 | Millican et al. | Nov. 15, 1949 |
| 2,503,507 | Olsen | Apr. 11, 1950 |

FOREIGN PATENTS

| 120,492 | Australia | Oct. 22, 1945 |